United States Patent [19]

Ohno

[11] 4,448,591

[45] May 15, 1984

[54] CUTTING INSERT HAVING UNIQUE CROSS SECTION

[75] Inventor: John M. Ohno, Plymouth, Mich.

[73] Assignee: General Electric Company, Detroit, Mich.

[21] Appl. No.: 331,381

[22] Filed: Dec. 16, 1981

Related U.S. Application Data

[63] Continuation-in-part of Ser. No. 226,604, Jan. 21, 1981.

[51] Int. Cl.³ .................. C04B 35/56; C04B 35/58
[52] U.S. Cl. .................................... 51/298; 51/307; 264/60; 264/113
[58] Field of Search .................. 51/307, 293, 298; 264/60, 113

[56] References Cited

U.S. PATENT DOCUMENTS

| | | | |
|---|---|---|---|
| 2,475,565 | 7/1949 | Houchins | 51/307 |
| 2,938,807 | 5/1960 | Anderson | 106/44 |
| 3,816,081 | 6/1974 | Hale | 75/203 |
| 4,018,631 | 4/1977 | Hale | 428/469 |
| 4,063,909 | 12/1977 | Mitchell | 51/309 |
| 4,120,731 | 10/1978 | Hillig et al. | 264/271 |
| 4,124,401 | 11/1978 | Lee et al. | 51/307 |
| 4,151,686 | 5/1979 | Lee et al. | 51/307 |
| 4,167,399 | 9/1979 | Lee et al. | 51/307 |
| 4,168,957 | 9/1979 | Lee et al. | 51/309 |
| 4,171,339 | 10/1979 | Lee et al. | 264/332 |
| 4,173,614 | 11/1979 | Lee et al. | 51/307 |
| 4,219,339 | 8/1980 | Wilson | 51/307 |
| 4,220,455 | 9/1980 | St. Pierre | 51/295 |
| 4,220,677 | 9/1980 | Fedoseev et al. | 427/215 |
| 4,231,195 | 11/1980 | DeVries | 51/307 |
| 4,238,433 | 12/1980 | Hillig et al. | 260/60 |
| 4,241,135 | 12/1980 | Lee et al. | 428/332 |
| 4,242,106 | 12/1980 | Morelock | 51/307 |
| 4,247,304 | 1/1981 | Morelock | 51/295 |
| 4,268,582 | 5/1981 | Hale | 428/466 |

FOREIGN PATENT DOCUMENTS

| | | | |
|---|---|---|---|
| 10257 | 4/1980 | European Pat. Off. | |
| 12966 | 7/1980 | European Pat. Off. | |
| 2006733 | 3/1979 | United Kingdom | |
| 624796 | 8/1976 | U.S.S.R. | 264/308 |

Primary Examiner—James H. Derrington
Attorney, Agent, or Firm—Hedman, Gibson, Costigan & Hoare

[57] ABSTRACT

A blank adapted to be mounted on a substrate to form a cutting insert is formed by preparing a crystal dispersion of super-hard crystals, such as diamond or cubic boron nitride crystals, and carbon black in a temporary binder, and a core dispersion of carbon fiber, carbon black and filler in a temporary binder. The crystal dispersion and the core dispersion are placed in a mold to respectively form a core dispersion layer and a crystal dispersion layer which forms a ring about the periphery of the core dispersion layer on the upper surface thereof. The crystal and core dispersion layers are compacted with a chamfered plunger applied to the lower surface of the core layer to form an intermediate composite having a recess at the lower surface thereby compressing the dispersions to a substantially uniform compaction throughout the intermediate composite. The intermediate composite is then heated to allow for the removal of the temporary binder and the infiltration of liquified silicon. The intermediate composite is then sintered to produce the blank, the crystal and core layers being bonded internally and to each other by a matrix of $\beta$-silicon carbide and silicon.

8 Claims, 13 Drawing Figures

CUTTING INSERT HAVING UNIQUE CROSS SECTION

CROSS REFERENCE TO RELATED APPLICATIONS

The present invention is a continuation in part of co-pending U.S. patent application Ser. No. 226,604, filed Jan. 21, 1981, by Dr. John M. Ohno, and assigned to the assignee of the present invention, the entire disclosure of which is hereby incorporated by reference. This invention is also related to co-pending U.S. patent application Ser. No. 286,613, filed July 24, 1981, also by Dr. John M. Ohno, and assigned to the assignee of the present invention, the entire disclosure of which is also incorporated herein by reference.

BACKGROUND OF THE INVENTION

Articles composed of materials having refractory characteristics such as hardness and resistance to erosion have many important uses. Representative materials are described in U.S. Pat. No. 2,938,807 to Anderson.

Reaction sintering of $\alpha$-silicon carbide and $\beta$-silicon carbide has been known for making high temperature components. For example, $\beta$-silicon carbide is described as an excellent binder in the above-mentioned patent to Anderson. However, no super-hard crystals are incorporated into the silicon carbide material.

The use of such super-hard crystals as diamond or cubic boron nitride lends superior characteristics, such as hardness, to the materials. Metals have been used to bind diamond crystals as described in U.S. Pat. No. 4,063,909 to Mitchell. Such metal may be, for example, Co, Fe, Ni, Pt, Ti, Cr, Ta and alloys containing one or more of these metals.

The above and other patents in the area of bonding super-hard crystals depend on hot press technology, as for example that described in U.S. Pat. No. 4,124,401 to Lee et al., U.S. Pat. No. 4,167,399 to Lee et al., and U.S. Pat. No. 4,173,614 to Lee et al., all of which patents are assigned to the assignee of the present invention. Reference is also made to U.S. Pat. No. 4,220,455 to St. Pierre, et al., and which is also assigned to the assignee of the present invention. The latter patent discloses a process for making a homogeneous diamond composite throughout an article, wherein individual crystals are coated and silicon is infiltrated into a porous preform indirectly through a wick material. The diamond composite made in accordance with the technique disclosed in U.S. Pat. No. 4,220,455 is expensive and does not readily lend itself to mass production techniques.

Many of the problems associated with the prior art have been overcome by the inventions disclosed in U.S. patent application Ser. Nos. 167,019, now abandoned, and 167,196, now abandoned both filed July 9, 1980, by Dr. John M. Ohno and assigned to the assignee of the present invention, the entire disclosures of which are hereby incorporated by reference. These patents disclose a straightforward technique (hereinafter referred to as the "press and treat" technique) for forming high quality composites which readily lends itself to mass production techniques. Very briefly, the press and treat technique involves the preparation of a first or a crystal dispersion of super-hard crystals such as diamond or cubic boron nitride crystals in carbon black and a second core dispersion carbon black, carbon fiber and filler material. The two dispersions are individually mixed with a small amount of temporary binder such as paraffin to lend a sufficient green strength to the two dispersions upon cold compaction thereof. After compacting the two dispersions together in a desired configuration, the compact is vacuum heated in the presence of silicon to burn off the paraffin and to allow the silicon to infiltrate both dispersions. Upon further heating, and without the need for the constant application of any type of pressure to the insert, the silicon reacts with the carbon black to form a $\beta$-silicon carbide and silicon matrix which bonds both dispersions both internally and to each other.

Further refinements to the press and treat technique described above, have been disclosed in co-pending U.S. patent applications Ser. Nos. 286,613 and 226,604, filed July 24, 1981 and Jan. 21, 1981, respectively, both by Dr. John M. Ohno and assigned to the assignee of the present invention, the entire disclosures of which are hereby incorporated by reference. In Ser. No. 286,613, the technique of providing an interface layer between the crystal and core dispersions is disclosed, the interface layer comprising a dispersion of super-hard crystals at a concentration less than that of the first crystal dispersion layer. By providing such interface layer, the cutting insert produced in accordance with Ser. No. 286,613 eliminates drastic changes or gradients in the composition of the cutting insert structure leading to a more rugged construction.

In Ser. No. 226,604, the second crystal dispersion is employed to form a cutting insert having the first crystal dispersion with the high percentage of crystals covering the top portion of the insert, the second dispersion, having the lower concentration of crystals surrounding the sides of the insert. Also disclosed is the use of a plunger having a chamfer for forming the bottom surface of the compacted core dispersion to compensate for warpage of the resulting composite during the sintering process. See FIGS. 6A, 6B, 7A and 7B of Ser. No. 226,604.

The use of multi-layered structures, such as those discussed above with respect to Ser. Nos. 226,604 and 286,613 may tend to cause problems with compaction of the dispersions due to the difference in compressibility between the various dispersions. For example, the first crystal dispersion, having a high concentration of super-hard crystals, is essentially incompressible, while the core dispersion, having no super-hard crystals therein is relatively highly compressible. The interface or second crystal dispersion, having a concentration of super-hard crystals less than that of the first crystal dispersion, has a compressibility intermediate than that of the first crystal dispersion and the core dispersion.

These differences in compressibilities may lead to non-uniform densifications of the composite, which in turn may cause variations in the amount of silicon infiltration and absorption in different parts of the composite. Such non-uniformities of silicon infiltration may result in warpage of the composite during the reaction sintering process.

SUMMARY OF THE INVENTION

It is therefore an object of the present invention to provide a compaction technique which produces even compaction of the various dispersions throughout the cutting insert.

It is a further object of the present invention to provide a compaction technique which provides superior compaction of the corner edges of the cutting insert.

It is a further object of the present invention to provide a compaction technique which eliminates warpage in the cutting insert due to sintering and which provides a bottom surface on the cutting insert which readily lends itself to high quality bonding onto a carbide substrate.

It is a further object of the present invention to provide a cutting insert having a plurality of dispersions which are compressed substantially uniformly throughout the insert, highly compact cutting edges, and a bottom surface having virtually no warpage due to sintering and which readily lends itself to adhesive bonding onto a carbide substrate.

In accordance with the first aspect of the present invention, a process for producing a blank adapted to be mounted on a substrate to form a cutting insert involves the preparation of at least one crystal dispersion of super-hard crystals, such as diamond or cubic boron nitride crystals, and carbon black in a temporary binder, and the preparation of a core dispersion of carbon fiber, carbon black and filler in a temporary binder. The crystal dispersion and the core dispersion are placed in a mold to respectively form at least one crystal dispersion layer and a core dispersion layer, the crystal dispersion layer forming a rim about the periphery of the core dispersion layer on the upper surface thereof. The crystal and core dispersion layers are then compacted with a chamfered plunger applied to the lower surface of the core layer to form an intermediate composite having a recess at the lower surface, thereby compressing the dispersions to a substantially uniform density throughout the intermediate composite. The intermediate composite is then heated to allow for the removal of the temporary binder and the infiltration of liquefied silicon. The composite is then sintered to produce the blank.

More specifically, the step of compacting described above is performed so as to impart a compressional force to at least part of the crystal dispersion having components in directions both parallel to and perpendicular to the direction of the motion of the plunger, such that the crystal dispersion layer is tightly compacted. The above process may further include bonding the blank onto a substrate by means of an adhesive disposed within the recess, whereby substantially no adhesive is visible. The adhesive may be one of polyamide or polyimide, and the filler may be super fine $\beta$-silicon carbide. The intermediate composite may be sintered for approximately 30 to 50 minutes, thereby reducing the amount of silicon required for proper bonding.

In accordance with the second aspect of the present invention, a blank adapted to be mounted on a substrate to form a cutting insert includes a core dispersion of carbon fiber and filler and at least one crystal dispersion of super-hard crystals, such as diamond or cubic boron nitride crystals. The core and crystal dispersions are respectively formed as adjacent layers bonded internally and to each other by a matrix of $\beta$-silicon carbide and silicon, the crystal dispersion forming a rim about the periphery of the core dispersion on the upper surface thereof. The core dispersion is formed with an indentation on the lower surface thereof which allows the blank to have substantially uniform density throughout.

BRIEF DESCRIPTION OF THE DRAWINGS

These and other objects, aspects and embodiments of the present invention will be more fully described with reference to the following drawing figures of which.

DETAILED DESCRIPTION OF THE INVENTION

Figure 1:
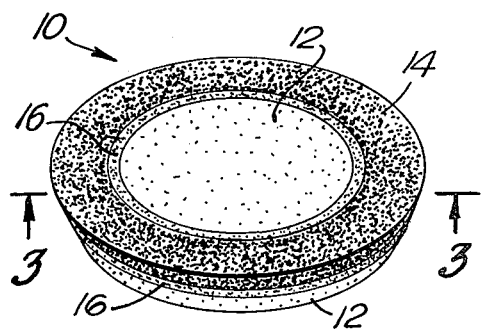
FIG. 1 is a perspective view of the top of the cutting insert produced in accordance with the present invention.
Figure 2:
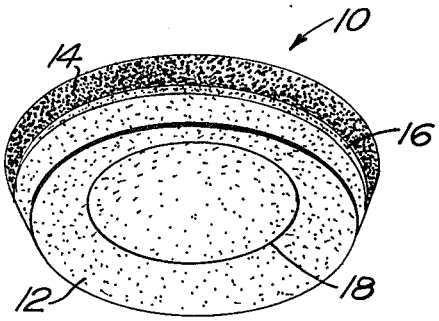
FIG. 2 is a perspective view of the bottom of the cutting insert produced in accordance with the present invention.
Figure 3:
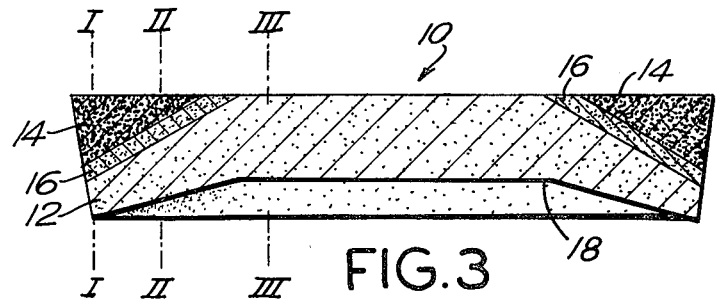
FIG. 3 is a cross-section view of the cutting insert illustrated in FIG. 1 taken through section 3—3.
Figures 6, 7:
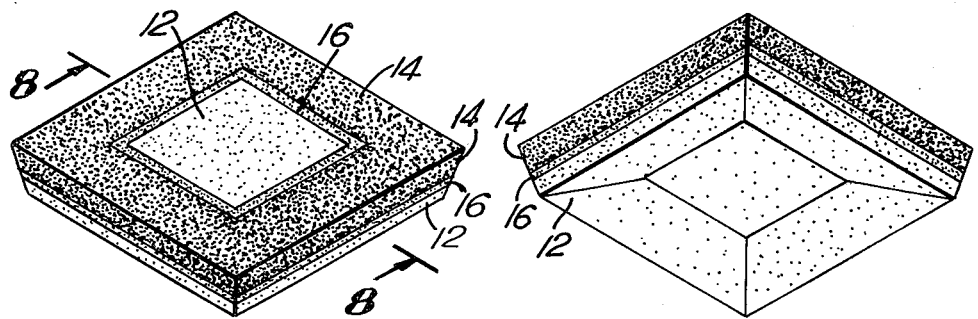
FIG. 6 is a perspective view of the top of the cutting insert produced in accordance with a second aspect of the present invention.
FIG. 7 is a perspective view of the bottom of the cutting insert produced in accordance with the second embodiment of the present invention.
Figure 8:
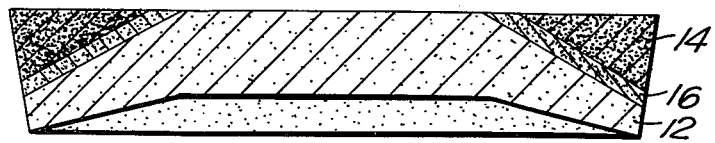
FIG. 8 is a cross-section view of the cutting insert illustrated in FIG. 6 taken along section 8—8.
Figures 9, 10:
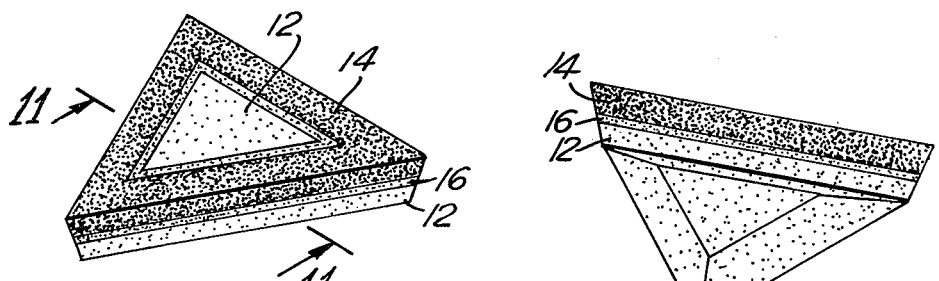
FIG. 9 is a perspective view of the top of the cutting insert produced in accordance with the third embodiment of the present invention.
FIG. 10 is a perspective view of the bottom of the cutting insert produced in accordance with the third embodiment of the present invention.
Figure 11:
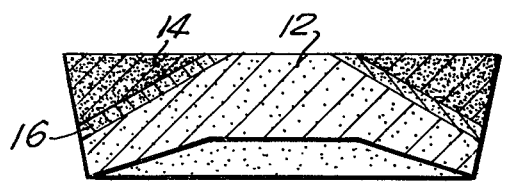
FIG. 11 is a cross-section illustration of the cutting insert of FIG. 9 taken through section 11—11.

FIGS. 1-3 illustrate a blank procedure according to the first or "round" embodiment of the present invention. FIGS. 6-8 illustrate the second, or "square" embodiments, and FIGS. 9-11 illustrate the third or "triangular" embodiment of the present invention. The blanks are adapted to be adhesively bonded to a substrate to provide a cutting insert. The step-by-step technique of forming each of the blanks is similar to that disclosed in Ser. No. 167,019 except that an intermediate or second crystal dispersion layer is provided between the first crystal dispersion and the core, as disclosed in Ser. Nos. 226,604 and 286,613.

The details of the invention will be discussed with reference to the first embodiment of the invention shown in FIGS. 1-3. However, the following discussion applies to the second and third embodiments as well, associated elements in each of the figures being identified with like reference numerals.

With specific reference to FIGS. 1-3, the round blank 10 is comprised of central core 12, first crystal dispersion layer 14 having a high concentration of super-hard crystals peripherally disposed along the upper surface of the insert, and a second crystal dispersion layer 16 comprising a crystal dispersion having a lower concentration of crystals than the first crystal dispersion 14, disposed between the first crystal dispersion layer 14 and the core 12. The bottom surface of the core 12 is provided with an indentation 18 which functions to provide greater compaction of the blank at the cutting edge, more uniform compaction of the entire blank, the elimination of warpage of the blank during sintering, and more secure bonding to a substrate with no visible adhesive layer at the interface. These and other advantages will be discussed below with reference to FIGS. 4 and 5 and further reference to FIG. 3.

In FIG. 3, three section lines, namely I—I, II—II and III—III are illustrated through three portions of the blank 10. Section I—I extends primarily through the two crystals dispersion layers 14 and 16, the predominant layer being the first crystal dispersion layer 14 having a high concentration of crystals. The second section line II—II traverses approximately equal amounts of crystal dispersion layers 14, 16 and core 12, while section III—III exclusively traverses core 12.

The compressibility of each of the dispersion layers 14 and 16 and core 12 varies significantly. Specifically, the compressibility of layer 14, having a high concentration of super-hard crystals, is essentially neligible, since the major component of such dispersion, namely the super-hard crystals, cannot be further compressed. The compressibility of the material in core 12, on the other hand, is quite high, since such material is a powder mix of carbon black, carbon fiber and filler material. Finally, the compressibility of the second crystal dispersion layer 16 falls somewhere between that of dispersion layer 14 and core 12.

Assuming for the moment that a flat plunger were used to compress the blank after loading the core material into a mold, it can be seen that for any given pressure imparted by the flat plunger, the greatest pressure would occur through section I—I, since very little compressible material is located therethrough. Conversely, much less compression would occur through section III—III since the highly compressible core material would only be compressed to the same thickness as the insert through section I—I, since the hypothetical plunger is flat. Thus, the blank through section I—I would be highly compressed, the blank through section III—III poorly compressed, while the blank through section II—II would compressed to an extent between that of section I—I and section III—III.

Such an uneven distribution of compression along the various portions of the blank, resulting from the use of a flat plunger, is highly undesirable, since the rate at which silicon infiltrates the various portions of the blank, as well as the total amount of silicon infiltration, during the press and treat technique is inversely proportional to the amount of compression in the various portions. Thus, the core 12 around the center of the blank has the highest silicon absorbing capability in the blank. In fact, the molten silicon will infiltrate much faster in the center portion of the blank than at the edge portions during reaction sintering. This condition may cause poor availability of silicon at the edge resulting in a deterioration of the quality of the blank.

Figure 4:
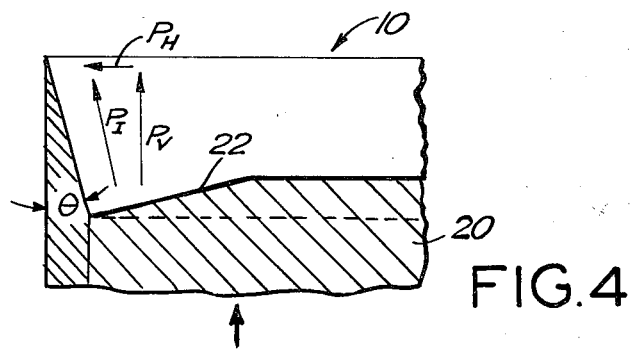
FIG. 4 is a vector diagram illustrating the various force components imparted to the insert upon compaction thereof.

The problem is solved in accordance with the present invention by providing plunger 20, FIG. 4, which is designed according to the compressibilities of the composite such that the core 12 is compressed more than the edges containing the super-hard crystals. Specifically, the plunger 20 is provided with chamfer 22 which forms indentation 18 on the lower surface of the blank. The use of chamfered plunger 20 allows the more compressible material at section III—III to be further compressed relative to the material at section I—I which has relatively low compressibility. The end result is a compact which has a substantially uniform densification throughout the entire length of the blank. As a result of the uniform densification throughout the blank, it has been found that, the amount of silicon required to produce a sufficient reaction may be reduced by increasing the reaction sintering time from 30 minutes to 50 minutes, and a higher percentage of super-hard crystals at the cutting edge may be provided. The quality of the blank may be further improved when super fine $\beta$-silicon carbide is used as the filler material (rather than relatively coarse $\alpha$-silicon carbide) in conjunction with the technique described herein.

A further advantage of the blank configured in accordance with the present invention will be described with reference to FIG. 4. Upon compaction of the blank 10 by the chamfered plunger, an incident pressure $P_I$ is imparted from the chamfered portion 22 of plunger 20 to the blank 10, the direction of incident pressure $P_I$ being normal to the face of the plunger at the chamfer 22. Since chamfer 22 is at an angle with respect to the horizontal as shown, the incident pressure $P_I$ can be resolved into a vertical component $P_V$ and a horizontal component $P_H$, as shown in FIG. 4. Thus, the cutting edges of the blank are not only compacted vertically in the conventional manner, but are also compacted horizontally, providing a more dense compact of super-hard crystals, which in turn allows a higher percentage of crystals at the cutting edges than heretofore attainable.

After forming the blank in the manner just described, the blank is vacuum heated to allow for the removal of the paraffin and the infiltration of liquefied silicon, and further heated to sinter the materials, as disclosed in the above-mentioned Ser. Nos. 167,019, now abandoned and 167,196, now abandoned.

Figure 5:
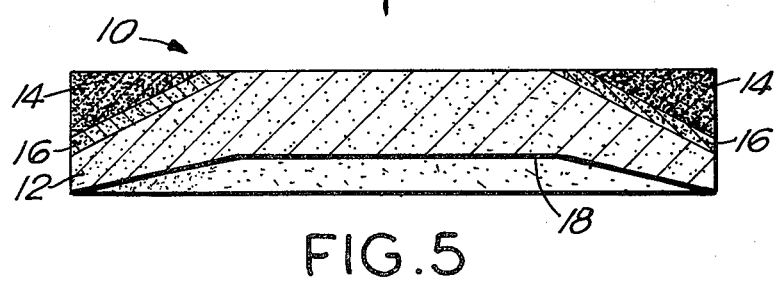
FIG. 5 is a cross-section diagram illustrating an alternative configuration which may be employed in any of the embodiments of the present invention.

The embodiments of the present invention illustrated in FIGS. 1-3 and 6-11 employ a positive relief blank, where the side wall of the blank extends radially inward from the cutting edge to the bottom of the blank at an angle $\Theta$ as shown in FIG. 4. This is contrasted to a neutral blank as illustrated in FIG. 5, where the side wall of the blank extends between the upper and lower surfaces of the blank as right angles thereto. However, in the alternative embodiments of FIG. 5, the same advantages as those described with reference to the FIG. 4 embodiments are obtained. However, forming the blank with the relief angle $\Theta$ at the time of compaction eliminates either soft forming of such relieve angle or the expensive and time consuming diamond grinding of the sintered product.

Another advantage of the blank made in accordance with the present invention is the elimination of warpage of the blank during sintering, as discussed in Ser. No. 226,604, and associated improvement in the bonding ability of the blank to a carbide substrate. In contrast to the present invention, a parallel blank produced by flat plunger requires the grinding of the lower surface to insure parallelism between the lower surface of the blank and the substrate. Such grinding is not only expensive and time consuming but is also extremely difficult, since small blanks will not stay on a magnetic holder, the blanks may be too thin to be held on their sides, and steel blocks provided to hold the blank cannot do so when the blank is provided with the relief angle $\Theta$. The flat blank is many times applied to a substrate with an uneven adhesive layer, randomly providing either too much or too little adhesive at various portions of the interface. Also, the bonded insert is poor in appearance since the adhesive is visible.

In contrast thereto, the present invention provides a blank which does not rock on a flat surface and may be easily secured to carbide substrate without grinding and without leaving a visible layer of adhesive. Further, the space provided within indentation 18 holds the adhesive very securely.

Figure 12:
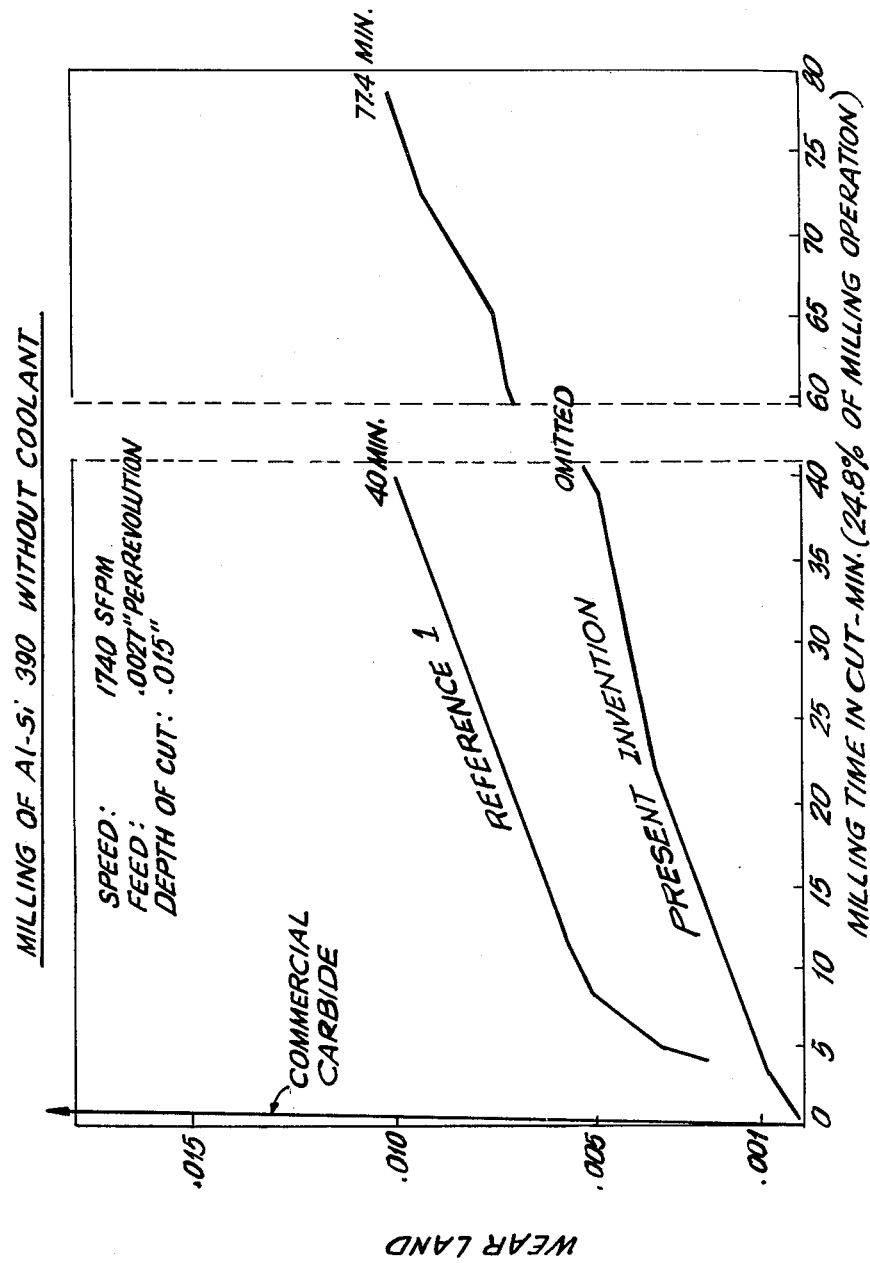
FIG. 12 and 13 are graphs illustrating the operational characteristics of the insert produced in accordance with the present invention.
Figure 13:
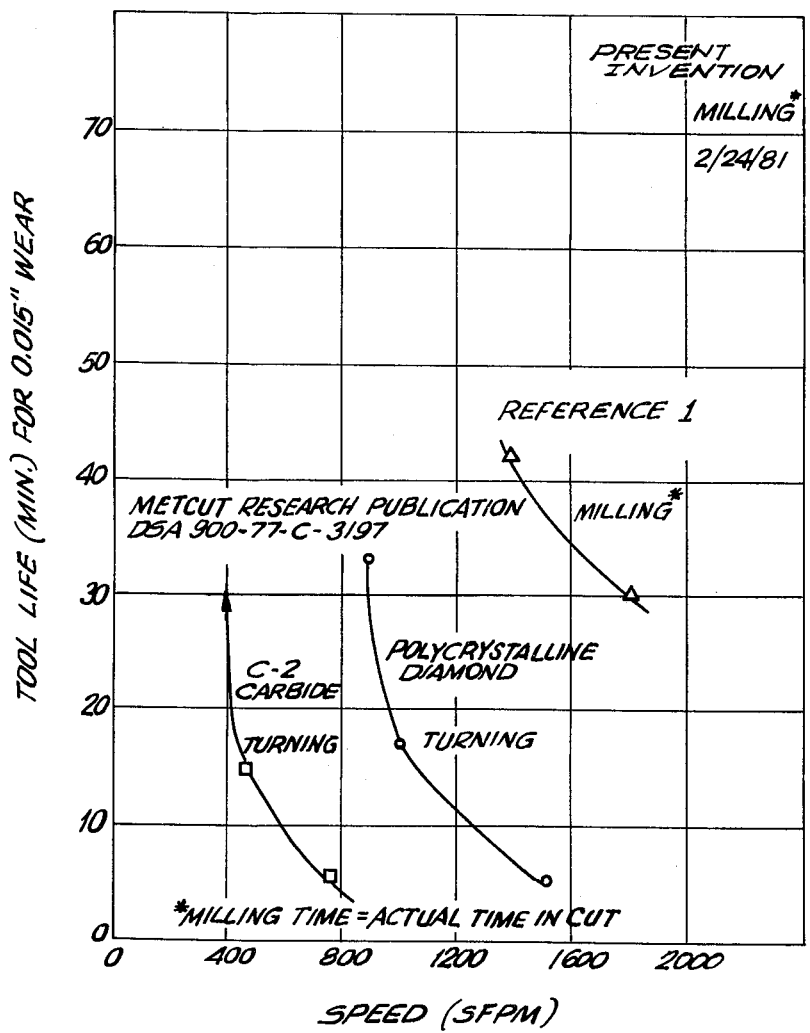

The blanks produced in accordance with present invention have been successfully tested. The adhesive used, polyamide or polymide, was found to be better in bonding the blank to a substrate than epoxy when used in either dry or wet machining. FIG. 12 illustrates insert wear as a function of cut time for a commercial carbide insert, the insert produced in accordance with Ser. No. 226,604 (Reference 1) and the insert produced in accordance with the present invention. FIG. 13 illustrates tool life in minutes vs. cutting speed for a commercial carbide insert, a polycrystalline diamond insert, such as that described in the Metcut Research Publication DSA 900-77-C-3197, the insert produced in accordance with Ser. No. 226,604 (Reference 1), and the insert produced in accordance with the present invention. The dramatic improvement in tool life and insert wear is readily illustrated by these graphs.

Thus, the blanks produced in accordance with the present invention provide more uniform compaction, a more dense compaction of the cutting edge portions of the blank, a reduction in warpage of the bottom surface of the blank, and better adhesion of the blank to a substrate, all of which combine to increase the life of the blank and to reduce wear over time.

The above-mentioned patents, patent applications and/or publications are incorporated herein by reference. Other modifications and variations of the present invention are possible, in the light of the above teachings. It is therefore, to be understood that changes may be made in the particular embodiments of the invention described which are within full intended scope of the invention as defined by the appended claims.

What is claimed is:

1. A process for producing a blank adapted to be mounted on a substrate to form a cutting insert, comprising the steps of:
    preparing at least one crystal dispersion of super-hard crystals selected from at least one member of the group consisting of diamond and cubic boron nitride crystals and carbon black in a temporary binder;
    preparing a core dispersion of carbon fiber, carbon black and filler in a temporary binder;
    placing said at least one crystal dispersion and said core dispersion in a mold to respectively form at least one crystal dispersion layer and a core dispersion layer, said at least one crystal dispersion layer forming a rim about the periphery of said core dispersion layer on the upper surface thereof;
    compacting said crystal and core dispersion layers with a chamfered plunger applied to the lower surface of said core layer to form an intermediate composite having a recess at said lower surface, thereby compressing said dispersions to a substantially uniform density throughout said intermediate composite;
    heating said intermediate composite to allow for the removal of said temporary binder and the infiltration of liquefied silicon into said intermediate composite; and
    sintering said intermediate composite to produce said blank.

2. The process of claim 1 wherein said step of compacting is performed so as to impart a compressional force to at least a part of said at least one crystal dispersion layer having components in directions both parallel to and perpendicular to the direction of motion of said plunger, such that said part of said at least one crystal dispersion layer is tightly compacted.

3. The process of claim 2 wherein said filler is super fine β-silicon carbide.

4. The process of claim 2 wherein said intermediate composite is sintered from approximately 30 to 50 minutes.

5. A blank adapted to be mounted on a substrate to form a cutting insert, comprising;
    a core of carbon fiber and filler;
    at least one crystal dispersion of super-hard crystals selected from at least one member from the group consisting of diamond and cubic boron nitride crystals;
    wherein said core and said at least one crystal dispersion are respectively formed as adjacent layers bonded internally and to each other by a matrix of β-silicon carbide and silicon, said at least one crystal dispersion forming a rim about the periphery of said core on the upper surface thereof, and said core being formed with a chamfered indentation on the lower surface thereof which allows said blank to have a substantially uniform compaction throughout.

6. A process for producing a blank adapted to be mounted on a substrate to form a cutting insert, comprising the steps of:
    preparing at least one crystal dispersion of super-hard crystals selected from at least one member of the group consisting of diamond and cubic boron nitride crystals and carbon black in a temporary binder;
    preparing a core dispersion of carbon fiber, carbon black and filler in a temporary binder;
    placing said at least one crystal dispersion and said core dispersion in a mold to respectively form at least one crystal dispersion layer and a core dispersion layer, said at least one crystal dispersion layer forming a rim about the periphery of said core dispersion layer on the upper surface thereof;
    compacting said crystal and core dispersion layers with a chamfered plunger applied to the lower surface of said core layer to form an intermediate composite having a recess at said lower surface, thereby compressing said dispersions to a substantially uniform density throughout said intermediate composite;
    heating said intermediate composite to allow for the removal of said temporary binder and the infiltration of liquefied silicon into said intermediate composite;
    sintering said intermediate composite to produce said blank; and
    bonding said blank onto a substrate by means of an adhesive disposed within said recess, whereby substantially no adhesive is visible.

7. The process of claim 6 wherein said adhesive is selected from one member of the group consisting of polyamide and polyimide.

8. The product produced in accordance with the process of any one of claims 1, 2, 3, 4 or 6.

* * * * *